(No Model.) 3 Sheets—Sheet 1.
W. F. WEITMYER.
DEVICE FOR SEAMING ROOFING PLATES.
No. 465,906. Patented Dec. 29, 1891.
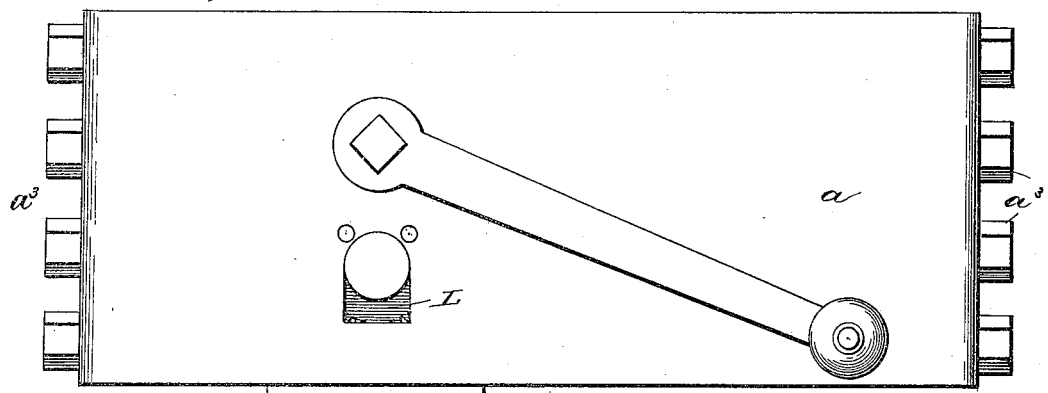
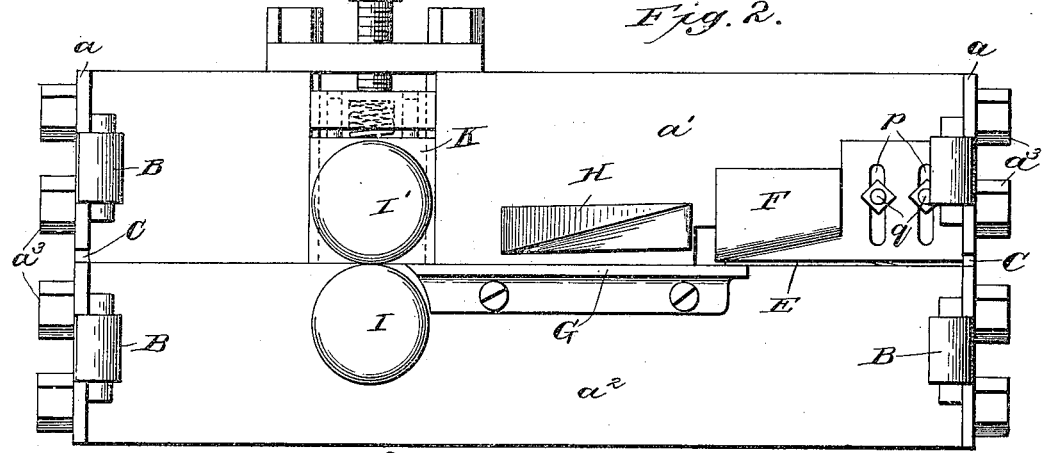
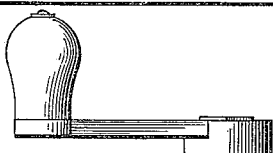
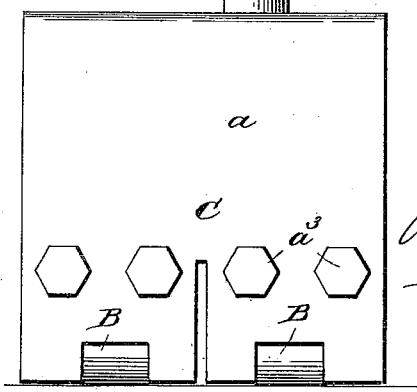
Witnesses
E. D. Smith
Thomas Durant
Inventor
Wm. F. Weitmyer
By
Church & Church
his Attorneys (No Model.) 3 Sheets—Sheet 2.
W. F. WEITMYER.
DEVICE FOR SEAMING ROOFING PLATES.
No. 465,906. Patented Dec. 29, 1891.
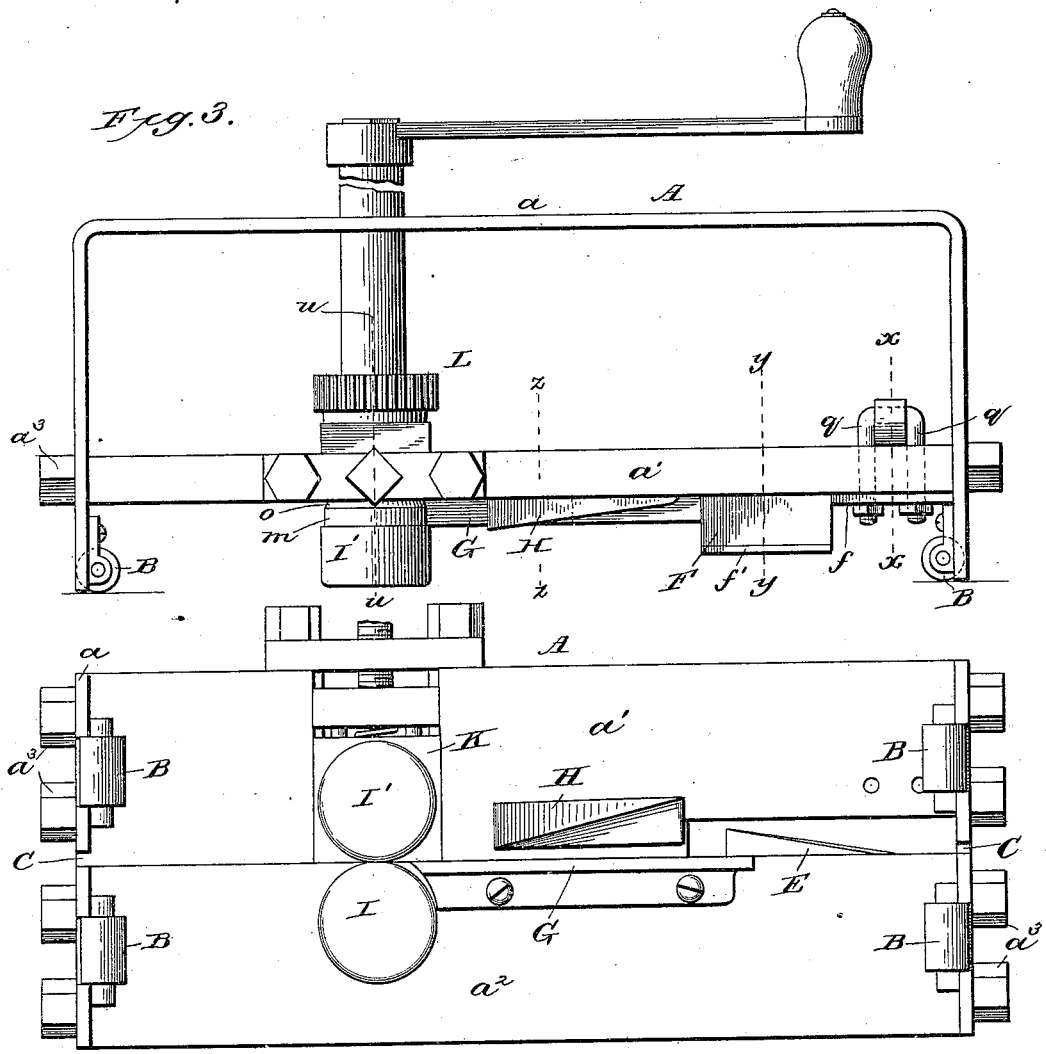
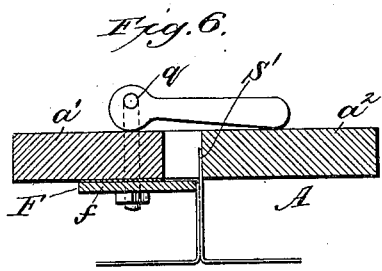

(No Model.) 3 Sheets—Sheet 3.

W. F. WEITMYER.
DEVICE FOR SEAMING ROOFING PLATES.

No. 465,906. Patented Dec. 29, 1891.

Witnesses
E. D. Smith
Thomas Durant

Inventor
Wm. F. Weitmyer,
By Church & Church
His Attorneys

UNITED STATES PATENT OFFICE.

WILLIAM F. WEITMYER, OF HARRISBURG, PENNSYLVANIA, ASSIGNOR OF TWO-THIRDS TO ALFRED S. HARBOLT AND MAURY D. JENKINS, OF SAME PLACE.

DEVICE FOR SEAMING ROOFING-PLATES.

SPECIFICATION forming part of Letters Patent No. 465,906, dated December 29, 1891.

Application filed March 3, 1891. Serial No. 383,549. (No model.)

*To all whom it may concern:*

Be it known that I, WILLIAM F. WEITMYER, of Harrisburg, in the county of Dauphin and State of Pennsylvania, have invented certain new and useful Improvements in Devices for Seaming Roofing-Plates; and I do hereby declare the following to be a full, clear, and exact description of the same, reference being had to the accompanying drawings, forming a part of this specification, and to the figures and letters of reference marked thereon.

My invention relates to that class of devices designed to form the seams between the plates in laying metallic roofing; and it consists in a certain improved construction and combination of parts, which I will first describe and then point out particularly in the claims at the close of this specification.

Figure 7:
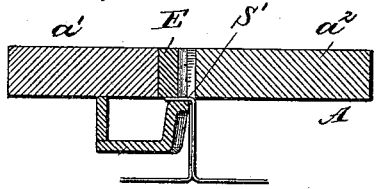
Figure 8:
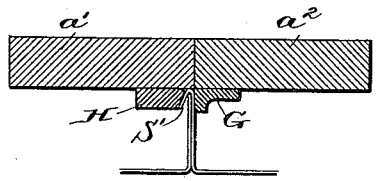
Figure 9:
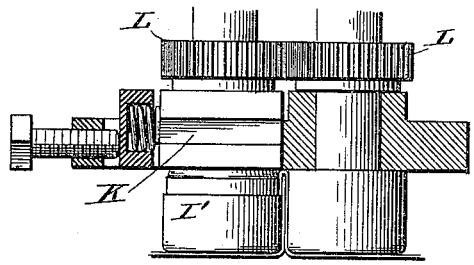
Figure 10:
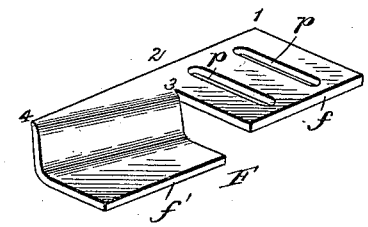
Figure 11:
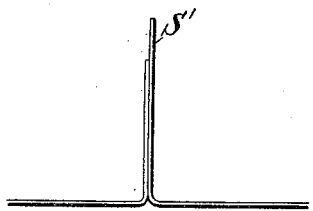

Referring to the accompanying drawings, Figure 1 represents a top view, Fig. 2 a bottom view, Fig. 3 a side view, and Fig. 4 an end view, of my improved device. Fig. 5 is a bottom view showing what I term the "combined guide and holder," removed; Fig. 6, a sectional view taken on the line $x\,x$, Fig. 3; Fig. 7, a similar view taken on the line $y\,y$, Fig. 3. Fig. 8 is a similar view taken on the line $z\,z$; Fig. 9, a similar view taken on the line $u\,u$; Fig. 10, a detached view of the combined guide and holder. Figs. 11, 12, 13, and 14 represent the seam or joint at different stages. Fig. 15 is a perspective view of one of the spiral guides.

Similar numerals and letters of reference in the several figures indicate the same parts.

The letter A represents a frame-work of metal made strong enough to sustain the operative parts of the device and to withstand the pressure to which it is subjected in use. I preferably form it in three main parts—to wit, an angle-plate $a$, constituting the top and ends, and two bottom plates $a'$ $a^2$, secured to the angle-piece $a$ by bolts $a^3$, as shown, or otherwise.

Suitably journaled in bearings upon the ends of the angle-piece $a$ are four wheels B, whose function is to support the device and enable it to travel with facility over the roof during the seaming operations.

As shown in Figs. 2 and 4, the ends of the frame are slotted vertically at C to accommodate the upturned flanges of metal to be united.

Figure 12:
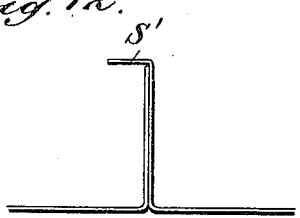
Figure 13:
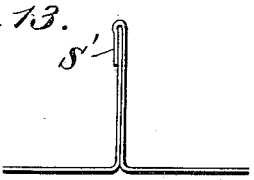

Secured to the bottom plate $a'$ is a spiral guide E, whose function is to impinge upon the upper portion of the longer flange S' of the seam and turn said flange down into horizontal position, as shown in Figs. 7 and 12; and below this spiral guide E is arranged what I term a "combined guide and holder" F, which consists of a substantially flat portion $f$ and a bent or flanged portion $f'$, as shown particularly in Fig. 10. The edge of the flat portion $f$ between the points 1 and 2 constitutes a guide for the vertical flanges of the roofing-plates, while the flanged portion $f'$ between the points 3 and 4 affords the edge over which the preliminary turn or bend of the longer flange S' is made by the action of the spiral guide E, as shown in Fig. 7.

Extending longitudinally of the plates $a'$ $a^2$, and slightly overlapping the flanged portion $f'$ of the combined guide and holder just described, is a straight guide G, which assists in supporting the flanges of the sheeting while the preliminary bend is being made upon the longer flange, as well as during the subsequent bending operation. Opposite the straight guide G and slightly beyond the guide and holder F is a second spiral guide H, whose function is to further turn the upper portion of the flange S' until it is substantially parallel with the body portion, as shown in Fig. 8, and still farther along are two rollers I I', whose functions are, first, to compress the turned-down flange S', and, secondly, to, by their traction upon the flanges, propel the device across the roof, so as to operate upon the whole length of the flanges. The roller I is preferably mounted in fixed bearings, while the roller I' is mounted in adjustable spring-pressed bearings K, as shown, so that when the cross-joints uniting the sheets of metal reach the rollers the latter will separate and permit such cross-joints to be passed without obstructing the operation of the machine. The rollers I I' are geared together by gears L L, and power is applied to the extended shaft of the roller I by means of a crank or other instrumentality. As will be observed by inspection of Fig. 7, the action of the first spiral guide E is to turn the flange S' down over the edge of the flanged portion of the combined guide and holder F. This position of said flanged portion beneath the turned-down flange is maintained during the whole seaming operation, and by reason of it any tendency of the machine to run up off the flanges is more effectually prevented. It is because of this function of holding the device down to its work that I have termed the part F a "combined guide and holder." In other machines of this class various expedients have been resorted to to keep the machine to its work; but I have found this simple appliance entirely effective.

For the purpose of enabling the device to be disengaged from the flanges when desired, I slot the flat portion of the combined guide and holder F, as shown at $p\ p$, and through these slots I pass the shanks of clamping-bolts $q\ q$, that also pass through the plate $a'$ and have at their upper ends a cam or other easily-operated fastening appliance. By loosening this cam the said guide and holder can be moved laterally and disengaged from the turned-down flange whenever it is necessary.

Figure 14:
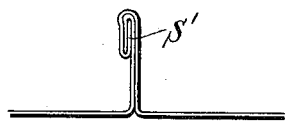

For the purpose of giving the final fold to the seam, so as to present a joint like that represented in Fig. 14, the machine must be again run over the flanges in the same manner as before; or, if it is desired to fully complete the joint at a single operation, the frame of the machine may be extended and a duplicate of the parts described added to such extended portion, as will be readily understood.

An objection heretofore existing to the use of rollers for giving the final finish to the seam has been that they were liable to break the metal at the edge of the seam, especially if the stock were not very good. I obviate this objection by decreasing the diameter of the roll I', as shown at $m$, so that it will accommodate the turned-down portion of the flange, and I further cut away or round out said roller at the point $o$, where the crown of the seam comes, the result of which is that the action of the rollers is to compress the metal below the crown of the flange, as shown in Fig. 14, and leave the crown of the flange entirely free from the liability of rupture.

With my device the seams of metal roofing can be formed with great ease and facility, and the character of work done is much better than can be produced with the ordinary appliances.

Having thus described my invention, what I claim as new is—

1. In the herein-described seaming-machine, the combination, with the frame and spiral guide for giving the preliminary turn to the flange, of the guide and holder having the long straight bearing-surface underlying the spiral guide, and over which the said preliminary bend is made, whereby a long section of the flange is held against said guide and holder and the machine thereby prevented from rising, substantially as described.

2. In the herein-described seaming-machine, the combination, with the spiral guide, of the combined guide and holder, consisting of the substantially flat portion having a straight bearing-edge and the bent or flanged portion having a bearing-edge in line with that on the flat portion, the straight guide, and the second spiral guide, substantially as described.

3. In the herein-described seaming-machine, the combination, with the stationary spiral guide, of the laterally-movable combined guide and holder having the flat portion and the bent or flanged portion, substantially as described.

4. In the herein-described seaming-machine, the combination, with the spiral guide, of the laterally-adjustable combined guide and holder, slotted, as described, and the bolts and locking devices for securing said guide and holder in adjusted position, substantially as described.

5. In the herein-described seaming-machine, the combination, with the frame mounted upon wheels and having the slotted ends, of the two spiral guides, the straight guide, the combined guide and holder having the flat portion and the flanged portion, and the feeding and compressing rolls, substantially as described.

6. In the herein-described machine for seaming roofs, the combination, with the spirals and guides for bending the seam, as described, of the compressing and guiding roller having the straight compressing-face and the groove or cut-out portion above said compressing-face to accommodate the bend in the seam, whereby pressure on the same and breaking of the stock are prevented, substantially as described.

WILLIAM F. WEITMYER.

Witnesses:
EDGAR L. KING,
JAMES JENKINS.